Aug. 7, 1928.

T. H. BIRCH 1,679,600

BRAKE CYLINDER RELEASE VALVE

Filed Oct. 21, 1926  2 Sheets-Sheet 1

Inventor
Thomas H. Birch,
By George Heideman
Attorney

Witnesses
Milton Lenoir
Elmer L. Quickel.

Aug. 7, 1928.
T. H. BIRCH
1,679,600
BRAKE CYLINDER RELEASE VALVE
Filed Oct. 21, 1926
2 Sheets-Sheet 2
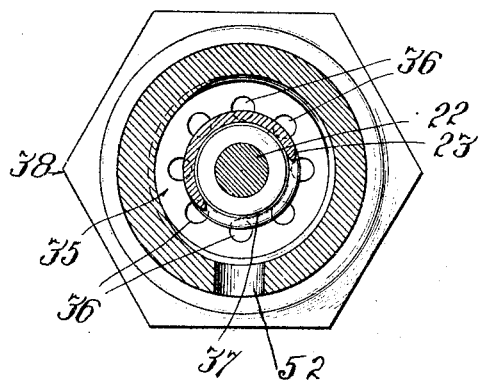
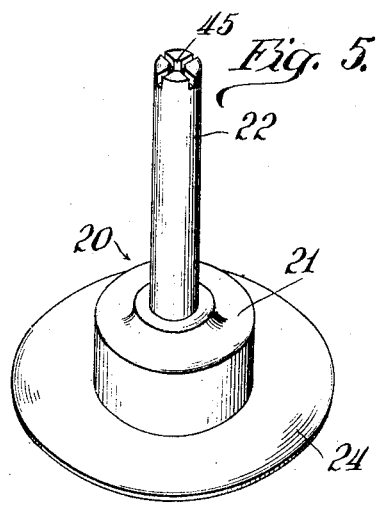
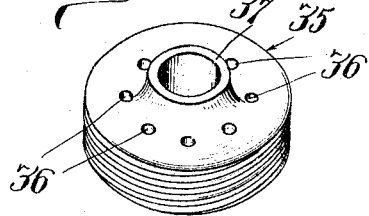
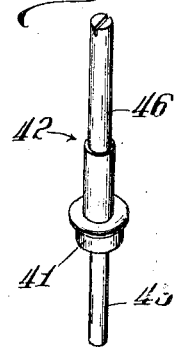
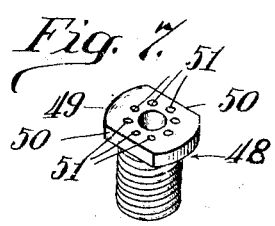

Patented Aug. 7, 1928.

1,679,600

UNITED STATES PATENT OFFICE.

THOMAS H. BIRCH, OF MILWAUKEE, WISCONSIN.

BRAKE-CYLINDER RELEASE VALVE.

Application filed October 21, 1926. Serial No. 143,088.

My invention relates to a release valve to be employed in the air brake system of railroad cars and has for its object the provision of a construction arranged and connected intermediate of the brake cylinder and an air line of the system so as to utilize the brake pipe pressure for effecting a release of the brake cylinder pressure independent of the usual triple valve employed in such systems.

My invention has for its object the provision of means whereby the action or operation of the triple valve will be improved, said means functioning even if the usual triple valve refuses to go to release position, with the result that the mechanisms are again ready or in condition for another brake application.

The objects and advantages of my invention will be more readily comprehended from the detailed description of the accompanying drawings, wherein—

Figure 3 is a sectional view taken on the line 3—3 of Figure 2 looking in the direction of the arrows.

Figure 4 is a perspective view of the pressure regulating member.

Figure 5 is a detail view in perspective of a plunger and diaphragm of my improved release valve.

Figure 6 is a detail perspective view of a vent member of my improved release valve.

Figure 7 is a detail perspective view of a guide and stop nut member for the vent member of my improved release valve.

My invention is devised for the purpose of effecting a release of the brake cylinder pressure and therefore for inducing a release of the brake shoes, by utilizing the brake pipe pressure for inducing such operation independently of the action of the usual triple valve of the air brake system.

As is well known in railroad practice, the sticking of the brakes is caused by the pressure being retained in the brake cylinder of the air brake system induced by failure of the main piston of the triple valve to return to release position when the brake pipe pressure is returned to normal. The release of the brake cylinder pressure can only be obtained when communication between the brake cylinder and the atmosphere has been established; a condition which obtains only when the triple valve main piston is in release position. When the brake system is charged and in release position there is approximately the same pressure in pounds per square inch on both sides of the main piston of the triple valve; and when a reduction of brake pipe pressure takes place the pressure on the auxiliary reservoir side of the main piston of the triple valve is greater and such pressure forces the main piston of the triple valve to move so as to permit the auxiliary reservoir pressure to flow into the brake cylinder. In order to release the brakes, it is necessary to build up the brake pipe pressure to a point higher than that which obtains on the auxiliary reservoir side of the triple valve main piston and this building up of brake pipe pressure should move the main piston of the triple valve to release position and therefore open direct communication between the brake cylinder and the atmosphere. Due to various mechanical defects and operating conditions, however, the triple valve does not always move to release position when desired and this results in sticking brakes.

Figure 1:
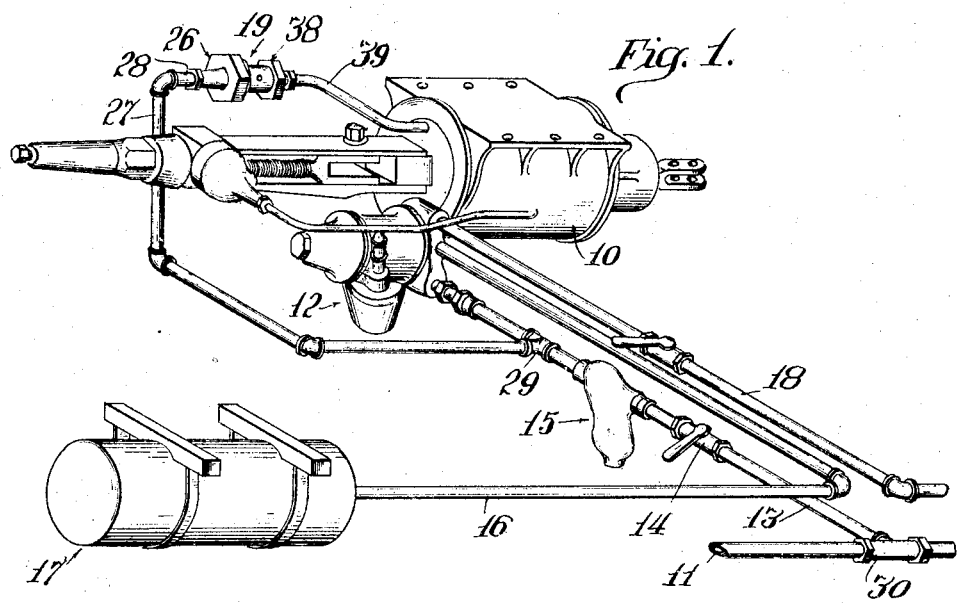
Figure 1 is a diagrammatic view of an air brake equipment, with portions of the brake pipes and air lines broken away; the figure illustrating a unit of an air brake system provided with my improved release valve.

My invention comprises suitable valve mechanism so disposed and connected as to provide means for an exhaust condition from the brake cylinder shown at 10 in Figure 1 and establish direct communication with the atmosphere, effective whenever the brake pipe pressure, namely in the brake pipe or line 11, is raised to predetermined pressure, regardless of the position of the main piston in the triple valve which latter is generally indicated at 12 and which has connection with the brake pipe or line 11 by means of branch line 13 in which is also usually located a cut-out cock as at 14 and a centrifugal dirt collector element indicated at 15. The triple valve 12 also has communication by means of line 16 with the auxiliary air reservoir 17.

As the general air brake system and the respective elements, to wit the triple valve construction, brake cylinder, auxiliary reservoir, connections between the triple valve, brake cylinder, auxiliary air reservoir and brake line or pipe, as well as the connections between a supplementary reservoir not shown (except for the pipe or line 18 leading thereto) and the brake rigging connections, all are of the standard well known type and construction, a detailed description of said elements and connections need not be here entered into.

Figure 2:
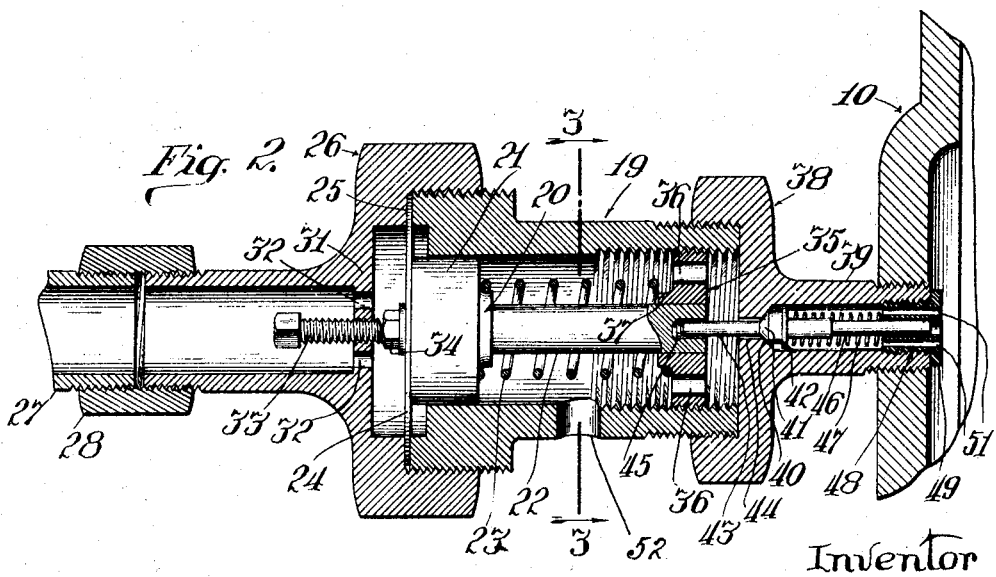
Figure 2 is a longitudinal sectional view of my improved release valve directly connected to the pressure head of the brake cylinder, said head of the cylinder and a portion of the connecting line or pipe being shown.

My improved release valve, as exemplified in the drawings, involves the main member or cylinder 19, provided with a piston 20 shown in detail in Figure 5 and consisting of the piston head or enlarged portion 21 having the spindle or stem 22 which is encircled by a suitable coil spring 23. The enlarged portion or head 21 is shown provided with a suitable diaphragm 24 preferably of rubber or other suitable fabric which is adapted to seat on the shoulder 25 of the coupling element 26 which latter is connected to the line or pipe 27 by means of a suitable union 28; the pipe 27 being connected by a suitable T-connection 29 to the pipe 13 which in turn is connected with the brake pipe 11 by the T-coupling 30. The coupling element 26 is provided with a partition or wall at 31 which in turn is provided with a suitable number of ports as at 32. This partition or wall 31 is shown provided centrally with a set-screw or stop member 33 adapted to contact centrally with a nut 34 whereby the diaphragm 24 is secured to the enlarged end or head 21 of the piston 20. This member 33 acts as a stop for the piston 20 against the action of the spring 23 which normally tends to force the piston member 20 with the diaphragm 24 to the left in Figure 2 and therefore to maintain the piston and diaphragm in normal position, as shown in Figure 2.

The opposite end of the cylinder or casing 19 is internally threaded to receive the ported pressure regulating member 35 shown in detail in Figure 4. This member 35 is externally threaded as shown so as to permit it to be screwed lengthwise within the casing 19 to regulate the resistance of the spring 23. The member 35 is provided with a suitable number of ports 36 and with a central apertured boss portion 37 (the latter forming a seat for spring 23) which receives the end of the stem 22 of the piston member 20 and permits the stem of the piston to slide freely through the central opening of member 35.

The cylinder or casing 19 at the end just referred to is also shown externally threaded to receive a coupling and vent member housing 38 which is provided with a reduced extension. This extension may be directly connected to a suitable port in the brake cylinder 10 as shown in Figure 2, or may be connected thereto by means of a pipe as shown at 39 in Figure 1.

The vent member housing 38 is provided with a valve-seat 40 to receive the tapered or beveled valve head 41 of the vent member 42 shown in detail in Figure 6. The vent member 42 is provided with an extension or stem 43 extending through an opening 44 in the wall of the vent member housing 38 and is adapted to extend into an axial socket 45 formed in the stem 22 of the piston member 20. The main stem portion 46 of the vent member 42 is provided with an encircling coil spring 47 which normally tends to keep the head 41 of vent member 42 on its seat and thereby close communication between the brake cylinder 10 and the main valve housing or casing 19 of my improved release mechanism.

The end of the reduced portion of the vent member housing and coupling 38 is internally threaded, preferably to receive the guide and stop nut member 48 shown in detail in Figure 7. This member 48 receives the outer end of the valve stem 46 and in turn provides an abutment or stop for the end of the coil spring 47. Screwing the stop-nut member 48 inwardly causes the spring 47 to be placed under tension. The stop-nut member 48 is provided with a head or flange portion as at 49 having the opposite flat surfaces or sides as at 50 in order to permit easy manipulation of the stop-nut member 48; and the head or flanged portion is also provided with a suitable number of circumferentially arranged ports 51 communicating with the passage through the stop-nut member, whereby communication between the brake cylinder 10 and the interior of the valve housing or cylinder 19 is established when the vent member 42 is off its seat.

When vent member 42 is unseated, namely with its tapered head 40 off the seat formed at the orifice of the passage 44, the pressure in brake cylinder 10 is vented to the atmosphere by allowing escape through a suitable port, as at 52, formed in the cylinder 19, and which is connected with the pressure retaining valve pipe (not shown) of the usual air brake system.

The invention has been illustrated in a simple embodiment and method of application, but modifications in certain details may be made without, however, departing from the spirit of my invention and the terms employed have been used merely as terms of description and not as terms of limitation.

What I claim is:

1. A device of the character described comprising a casing adapted to be connected at opposite ends with the brake pipe and with the brake cylinder of a railroad air brake system and provided with an exhaust port, a diaphragm carrying member in said casing whereby communicating between the casing and brake pipe is closed, a spring for placing said member and diaphragm under pressure, means adjustable in the casing for regulating the pressure of said spring, and means in the connection between said casing and the brake cylinder for controlling communication between the casing and the cylinder, said last means being actuated by said diaphragm carrying member when the pressure on the brake pipe side of the diaphragm reaches a predetermined degree, whereby communication between the brake cylinder and said casing is established.

2. In a device of the character described, a casing connected at opposite ends with the brake pipe and with the brake cylinder of an air brake system and provided with a vent opening intermediate of its ends, a flexible diaphragm in the connection between the casing and the brake pipe, stop means arranged on one side of the diaphragm, regulable means on the opposite side of the diaphragm for controlling the movement of flexing of said diaphragm, a valve in the connection between said casing and the brake cylinder and operable by flexure of the diaphragm, whereby air pressure in the brake cylinder is vented through the vent opening in the casing when the brake pipe pressure reaches a predetermined degree.

3. In a device of the character described, a casing provided with a vent opening, cored members secured to opposite ends of the casing for effecting connection, respectively, with the brake pipe and with the brake cylinder of an air brake system, a flexible diaphragm intermediate of the casing and the cored member at the brake pipe end of the casing, stop means for said diaphragm arranged in said cored member, a spring controlled piston in said casing adapted to be actuated by flexing of said diaphragm, a ported member adjustable in the casing for regulating the spring pressure of said piston, a normally seating valve in the cored member at the brake cylinder end of the casing adapted to be unseated by said piston, whereby the air pressure in the brake cylinder will be vented through the casing vent opening when the air pressure on the opposite side of the diaphragm reaches a predetermined degree.

4. A device of the character described, in combination with the air brake pipe and the brake cylinder of a railroad air brake system, comprising a casing connected at one end with said brake pipe and at the other end with said cylinder, a vent opening intermediate of the ends of the casing, said casing at the cylinder end being internally threaded and having a reduced extension provided with a valve-seat in advance of the connection with the brake cylinder, a valve normally seated on said valve-seat for closing communication between the casing and the brake cylinder, a spring-controlled piston in the casing, a flexible diaphragm in the casing on the brake pipe side of the piston, means for limiting movement of the piston toward the brake pipe end of the casing, and a ported member threaded into the internally threaded end of the casing whereby the pressure of the spring on said piston may be regulated.

5. A device of the character described comprising a casing having a vent port intermediate of its ends and provided with a reduced extension at one end adapted to be connected with the brake cylinder of an air brake system, a coupling element secured to the other end of the casing for effecting communication with the air brake pipe of the air brake system, a flexible diaphragm secured between the end of the casing and said coupling element, a piston in said casing bearing against said diaphragm, a spring for normally forcing the piston toward the diaphragm, an adjustable stop member carried in the coupling element for limiting movement of the diaphragm and piston in one direction, a ported member adjustable within the casing and encircling the piston rod for regulating the pressure of said spring, a spring-controlled valve in said reduced extension, and a ported stop member secured at the end of said reduced extension for maintaining the spring of said valve under tension.

THOMAS H. BIRCH.